(12) United States Patent
Ito et al.

(10) Patent No.: US 7,511,402 B2
(45) Date of Patent: Mar. 31, 2009

(54) POLYMER ACTUATOR

(75) Inventors: Hidetoshi Ito, Kanagawa (JP); Koichiro Kezuka, Kanagawa (JP)

(73) Assignee: Sony Corporation

( * ) Notice: Subject to any disclaimer, the term of this patent is extended or adjusted under 35 U.S.C. 154(b) by 720 days.

(21) Appl. No.: 10/536,934

(22) PCT Filed: Nov. 25, 2003

(86) PCT No.: PCT/JP03/14975

§ 371 (c)(1),
(2), (4) Date: Sep. 29, 2005

(87) PCT Pub. No.: WO2004/054082

PCT Pub. Date: Jun. 24, 2004

(65) Prior Publication Data

US 2006/0050189 A1 Mar. 9, 2006

(30) Foreign Application Priority Data

Dec. 10, 2002 (JP) ............................. 2002-357805

(51) Int. Cl.
*H01L 41/08* (2006.01)
(52) U.S. Cl. .................. 310/300; 310/311; 310/800
(58) Field of Classification Search ............... 310/300, 310/309, 311, 363, 365, 800
See application file for complete search history.

(56) References Cited

U.S. PATENT DOCUMENTS

| | | | | |
|---|---|---|---|---|
| 5,250,167 A | * | 10/1993 | Adolf et al. .................. 310/309 |
| 6,249,076 B1 | * | 6/2001 | Madden et al. ............. 310/363 |
| 6,475,639 B2 | * | 11/2002 | Shahinpoor et al. ......... 428/614 |
| 7,388,321 B2 | * | 6/2008 | Hattori et al. ............... 310/311 |
| 7,443,087 B2 | * | 10/2008 | Hattori et al. ............... 310/339 |
| 2006/0050189 A1 | * | 3/2006 | Ito et al. ....................... 349/33 |
| 2007/0120450 A1 | * | 5/2007 | Hattori et al. ............... 310/800 |
| 2007/0152543 A1 | * | 7/2007 | Hattori et al. ............... 310/800 |
| 2007/0190150 A1 | * | 8/2007 | Ito et al. ..................... 424/486 |
| 2007/0210678 A1 | * | 9/2007 | Hattori et al. ............... 310/366 |
| 2007/0257582 A1 | * | 11/2007 | Yokoyama et al. .......... 310/800 |

FOREIGN PATENT DOCUMENTS

| | | |
|---|---|---|
| JP | 2041685 | 2/1990 |
| JP | 5076599 | 3/1993 |
| JP | 07-97912 | 10/1995 |
| JP | 10118874 | 5/1998 |
| JP | 2002258001 | 9/2002 |

* cited by examiner

*Primary Examiner*—Mark Budd
(74) *Attorney, Agent, or Firm*—Bell, Boyd & Lloyd LLP

(57) ABSTRACT

A polymer actuator is provided. The polymer actuator includes a plurality of gel/electrode complexes arranged in an electrolytic solution, wherein the gel/electrode complex is composed of a polymeric hydrogel containing acidic or basic functional groups and electrodes placed in the polymeric hydrogel, such that it changes in volume upon application of a voltage across said electrodes. The polymer actuator expands and contracts in the linear direction without curved deformation. The polymer actuator is light in weight and is capable of control with a low voltage.

13 Claims, 4 Drawing Sheets

POLYMER ACTUATOR

CROSS REFERENCE TO RELATED APPLICATION

The present application claims priority to Japanese Patent Document No. P2002-357805 filed on Dec. 10, 2002, the disclosure of which is herein incorporated by reference.

BACKGROUND

The present invention relates to a polymer actuator.

The usefulness of robots is attracting attention in various fields including nursing care service, dangerous work, and entertainment. Robots suitable for these uses are required to have articulations (movable parts) similar to those of animals that permit complex movements.

A conventional actuator to drive these movable parts is a magnetic rotary motor. This actuator, however, suffers the disadvantage of being heavy because it is made of metal. Weight of actuators built into movable parts add to loads. Heavy actuator needs large outputs, and powerful actuators are large and heavy. Moreover, magnetic rotary motors require speed reducers to control rotating speed and torque. Speed reducers deteriorate with time as gears therein wear out. Ultrasonic motors producing a high torque at a low rotating speed do not need speed reducers; but they are also heavy because they are made of metal.

For this reason, there have recently been developed polymer actuators in which a light flexible polymeric material plays an important role. They include polymeric piezoelectric elements (which employ polyvinylidene fluoride), conducting polymer actuators (which employ electron conducting polymers), and gel actuators (which employ polymeric gel).

The gel actuator, particularly the one which employs a water-swelling polymeric hydrogel, relies for its action on a polymeric hydrogel which changes in volume in response to temperature, ionic strength, and pH in its environment. The amount of change in volume is 30 to 50% and the change in volume generates a force of 0.3 to 0.4 MPa. This performance is comparable to that of skeletal muscles. The polymeric hydrogel, however, has some disadvantages. It cannot be heated or cooled rapidly. It needs an electrolytic solution to control ion strength and pH, which has to be circulated by a pump and stored in a reservoir. Consequently, it is not suitable for small, light systems.

There is another type of polymeric hydrogel, which is called a pH-responsive polymeric hydrogel. This hydrogel is characterized in that the polymer molecules constituting it have acidic or basic functional groups, so that it changes in volume and swelling degree depending on the pH of its surrounding aqueous solution. The one having acidic functional groups works in the following way. When it is in an electrolytic aqueous solution with a high pH, the acidic groups dissociate protons to become anions, thereby increasing in hydrophilicity and generating repulsive forces in or between negatively charged molecules. This causes the gel to swell. Conversely, in an electrolytic aqueous solution with a low pH, the acidic groups in the gel do not dissociate but form hydrogen bond between them. This causes the gel to shrink.

By contrast, a pH-responsive polymeric hydrogel which have basic groups works in an opposite way. That is, in an electrolytic aqueous solution with a high pH, the basic groups in the gel protonize to become cations, thereby increasing in hydrophilicity and generating repulsive force in or between positively charged molecules. This causes the gel to swell.

Thus, when in use, the pH-responsive polymeric hydrogel is immersed in an electrolytic aqueous solution, and a voltage of about 1 to 3 V is applied across electrodes placed therein. This voltage forms an ion concentration gradient in the electrolytic aqueous solution and changes the pH value in the neighborhood of the electrodes. This mechanism makes it possible to control the swelling and contraction of the pH-responsive polymeric hydrogel only with a low voltage (e.g., 1 to 3 V) without requiring heating and cooling units, pumps, and reservoirs.

The foregoing principle is put into practice as shown in FIG. 5. There is shown a container 10 holding an electrolytic aqueous solution 11. The container 10 is provided with two electrodes 12a and 12b. Between the two electrodes is placed a pH-responsive polymeric hydrogel 13. Upon application of a voltage across the electrodes 12a and 12b, the pH of the electrolytic aqueous solution 11 in the neighborhood of the electrode 12b (anode) increases and the gel 13 close to the electrode 12b swells. At the same time, the pH of the electrolytic aqueous solution 11 in the neighborhood of the electrode 12a (cathode) decreases and the gel 13 close to the electrode 12a shrinks. As the result, the gel 13 curves and deforms. The pH-responsive polymeric hydrogel curves and deforms in the opposite direction if it is composed of polymer having basic groups.

The deformation that takes place as mentioned above may be used for an actuator. In fact, there is known an actuator which electrochemically produces curved displacement from a pH-responsive polymeric hydrogel film held between electrodes connected to a voltage source. (See Japanese Patent Publication No. Hei-7-97912.) Incidentally, this actuator produces a force of about 0.01 mPa due to curved displacement in the lengthwise direction.

Unfortunately, the actuator of curved displacement type is hardly applicable to robot articulations unlike the actuator capable of extending and contracting in the linear direction like skeletal muscles. Moreover, the force produced from curved deformation is usually weak.

The gel can be made to expand (elongate) and contract without curving if the distance between electrodes is increased and the gel is brought nearer to one electrode so that the gel is less affected by the other electrode. However, it is very difficult to fix the gel near one electrode while allowing the gel to expand and contract freely.

SUMMARY

The present invention was completed in order to address the above-mentioned problems. The present invention provides a polymer actuator which is capable of expanding and contracting in the linear direction without curving and which is also light in weight and capable of operation at a low voltage.

The present invention is concerned with a polymer actuator which comprises a plurality of gel/electrode complexes arranged in an electrolytic solution, said gel/electrode complex being composed of a polymer gel containing acidic or basic functional groups and electrodes placed in the polymer gel, such that it changes in volume upon application of a voltage across said electrodes.

Being constructed as mentioned above, the polymer actuator of the present invention obviates the necessity for heating and cooling units, pumps, and reservoirs unlike conventional ones, and it is light in weight and capable of control with a low voltage, such as 1 to 3 V. Moreover, it is capable of expansion and contraction in the linear direction like skeletal muscles without curved displacement unlike conventional ones.

The gel/electrode complex changes in volume to generate a force that actuates robots' articulations (movable parts).

Additional features and advantages of the present invention are described in, and will be apparent from, the following Detailed Description and the figures.

DETAILED DESCRIPTION

According to an embodiment of the present invention, the polymer gel should preferably be composed of a polymeric hydrogel, and the electrolytic solution should preferably be an electrolytic aqueous solution.

The polymer actuator according to an embodiment of the present invention should preferably be constructed of more than one unit of the gel/electrode complex, with the gel containing acidic functional groups, and more than one unit of the gel/electrode complex, with the gel containing basic functional groups.

Figure 1:
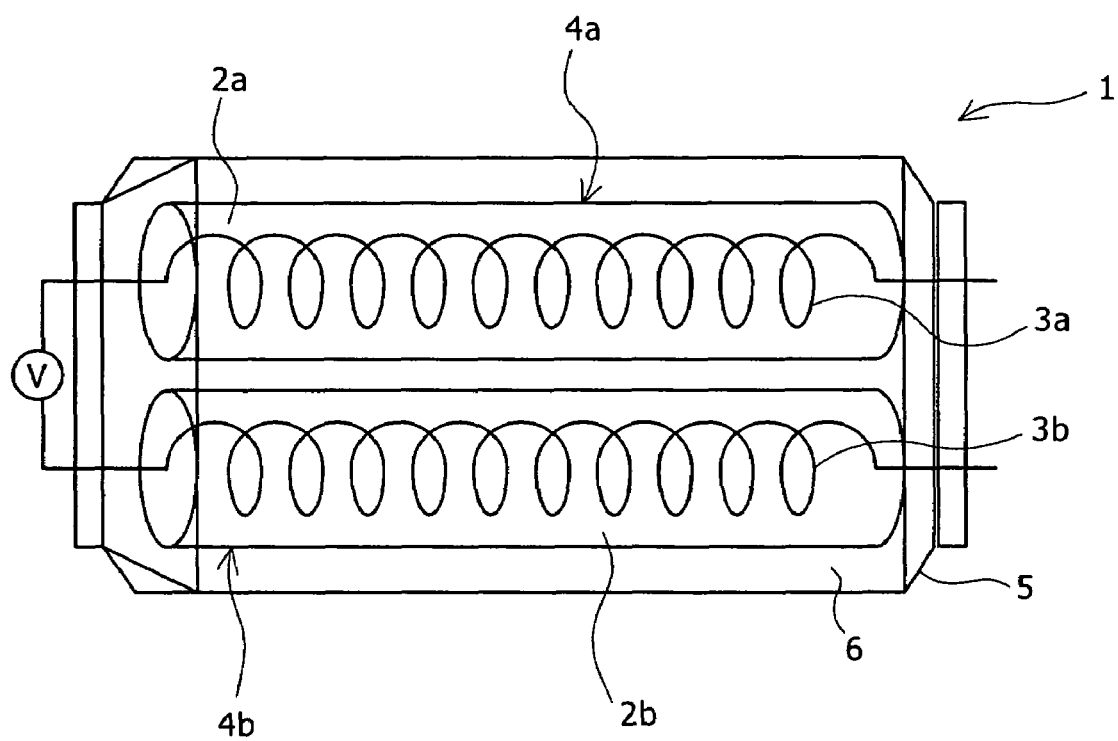
FIG. 1 is a schematic perspective view showing the structure of the polymer actuator according to one embodiment of the present invention.
Figure 2A:
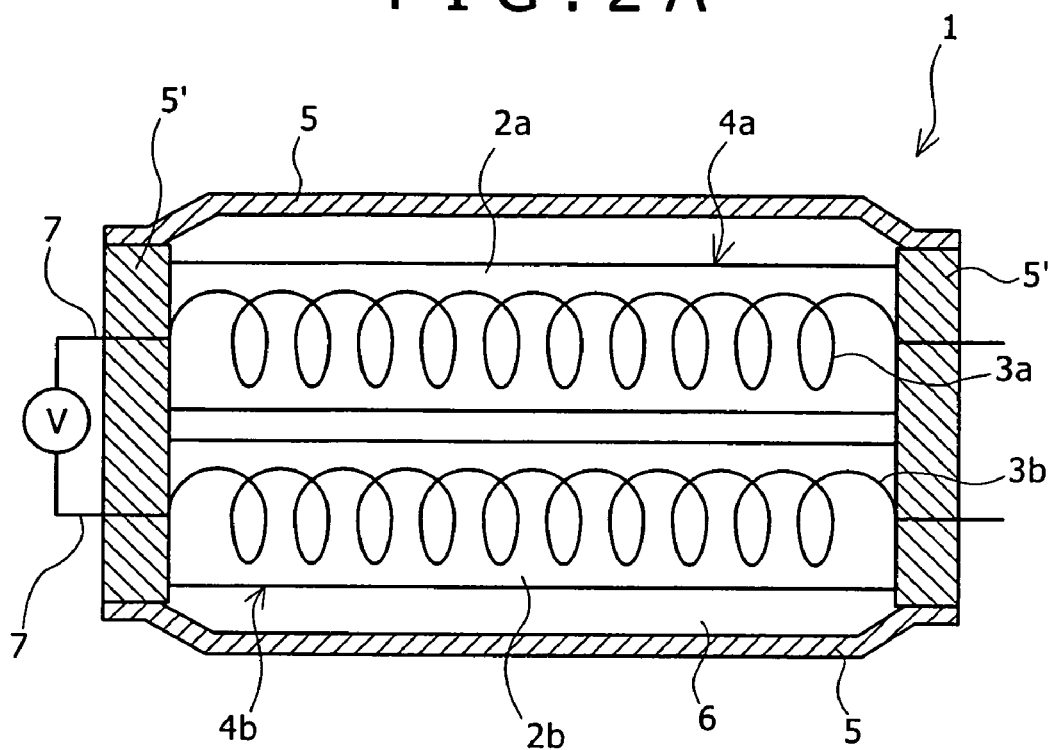
FIGS. 2A and 2B are schematic sectional views showing the polymer actuator according to one embodiment of the present invention. They show the polymer actuator in its expanded (elongated) state and contracted state, respectively.
Figure 2B:
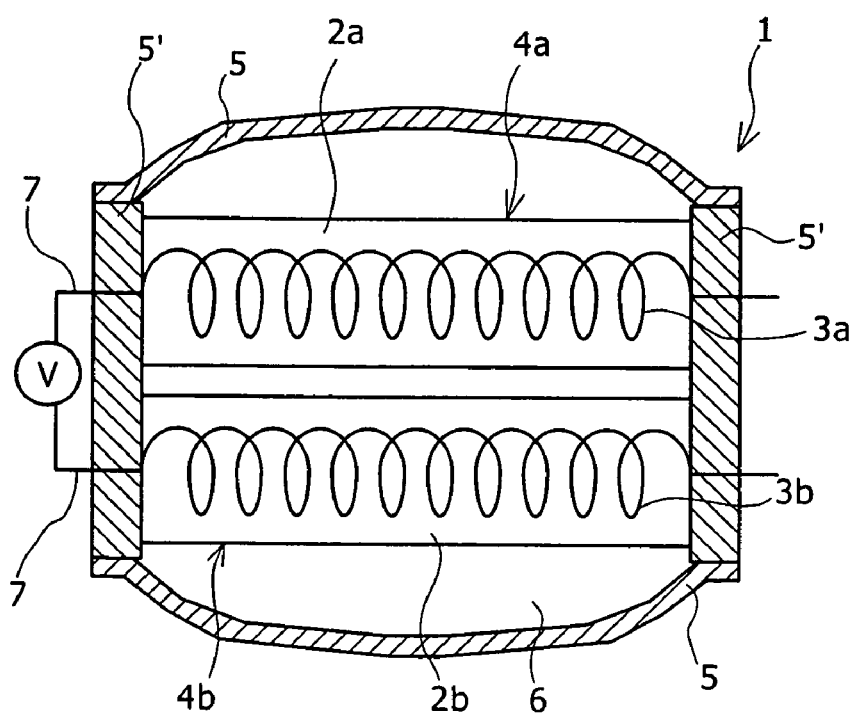
Figure 3A:
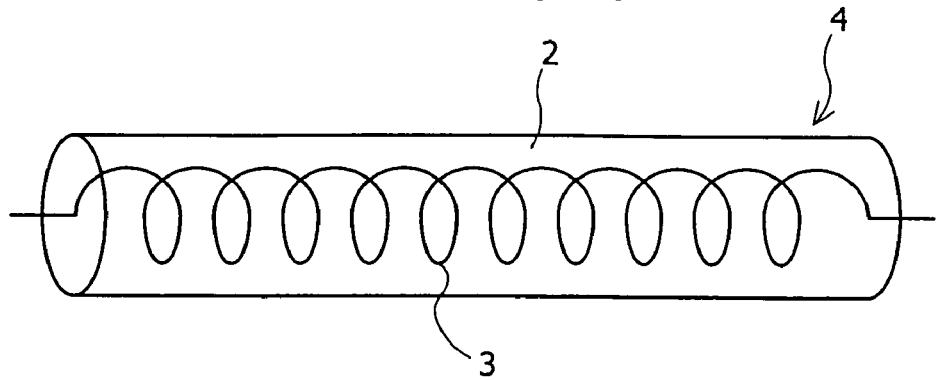
FIGS. 3A and 3B are schematic perspective views showing gel/electrode complex constituting the polymer actuator according to one embodiment of the present invention. They show the gel/electrode complex in its expanded (elongated) state and contracted state, respectively.
Figure 3B:
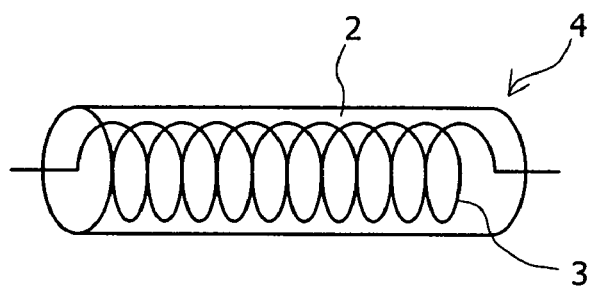

FIG. 1 is a schematic perspective view showing the structure of the polymer actuator 1 according to the present invention. FIGS. 2A and 2B are schematic sectional views showing the polymer actuator 1 according to the present invention.

As shown in FIG. 1 and FIGS. 2A and 2B, the polymer actuator 1 according to the present invention should preferably be constructed of a gel/electrode complex 4a and a gel/electrode complex 4b. The gel/electrode complex 4a is composed of a polymeric hydrogel 2a having acidic functional groups and an electrode 3a placed in the polymeric hydrogel 2a, 1 occasionally referred to as an acidic gel/electrode complex hereinafter. The gel/electrode complex 4b is composed of a polymeric hydrogel 2b having basic functional groups and an electrode 3b placed in the polymeric hydrogel 2b.

The gel/electrode complexes 4a and 4b are arranged in the container 5, which is filled with the electrolytic aqueous solution 6. The electrodes 3a and 3b pass through the ends of the container 5. Incidentally, the gel/electrode complexes 4a and 4b are approximately parallel to each other. The container 5 should preferably be capable of expanding and contracting in response to the volume change of the gel/electrode complexes 4a and 4b.

The gel/electrode complexes 4a and 4b change in volume upon application of voltage across the electrodes 3a and 3b, said voltage changing the pH value of the electrolytic aqueous solution in the vicinity of the gel/electrode complexes 4a and 4b.

The electrode 3a of the acid gel/electrode complex 4a may function as a cathode, and the electrode 3b of the basic gel/electrode complex 4b may function as an anode. Application of a voltage (1 to 3 V) across these electrodes changes the pH value as follows. The pH value of the electrolytic aqueous solution 6 in the vicinity of the electrode 3a (cathode) decreases, causing the acidic gel/electrode complex 4a to contract on account of hydrogen bonds forming between acidic groups (which remain undissociated). On the other hand, the pH value of the electrolytic aqueous solution 6 in the vicinity of the electrode 3b (anode) increases, causing the basic gel/electrode complex 4b to contract on account of hydrogen bonds forming between basic groups (which remain unprotonized). (See FIG. 2B)

When voltage is removed or when voltage polarity is reversed, the pH value of the electrolytic aqueous solution in the vicinity of the acidic gel/electrode complex 4a increases. The pH increase causes the acidic groups in the acidic gel/electrode complex 4a to become anions, with the acidic groups dissociating protons, thereby making the acidic gel more hydrophilic and increasing intra- or intermolecular repulsive force due to negative charges. As the result, the acidic gel/electrode complex 4a expands. On the other hand, the pH value of the electrolytic aqueous solution in the vicinity of the basic gel/electrode complex 4b decreases. The pH decrease causes the basic groups in the basic gel/electrode complex 4b to become cations, with the basic groups protonized, thereby making the basic gel more hydrophilic and increasing intra- or intermolecular repulsive force due to positive charges. As the result, the basic gel/electrode complex 4b expands. (See FIG. 2A.)

The polymer actuator 1 according to the present invention has the gel/electrode complexes 4a and 4b arranged in the electrolytic aqueous solution 6, so that the gel/electrode complexes 4a and 4b change in volume upon application of a voltage across the electrodes 3a and 3b of the gel/electrode complexes 4a and 4b, as mentioned above. Therefore, it obviates the necessity for cooling and heating units, pumps, and reservoirs, and it is light in weight and is capable of control at a low voltage (say, 1 to 3 V).

In addition, the gel/electrode complexes 4a and 4b are constructed of polymeric hydrogels 2a and 2b having acidic or basic functional groups, and the electrodes 3a and 3b arranged in the polymeric hydrogels 2a and 2b. Consequently, both of the gel/electrode complexes 4a and 4b expand and contract in the same direction upon voltage application. The gel/electrode complexes 4a and 4b in a rodlike shape as illustrated expand and contract in the lengthwise direction without curved displacement unlike the conventional ones.

The gel/electrode complexes 4a and 4b change in volume in such a way that the polymeric hydrogels 2a and 2b do not separate from the electrodes 3a and 3b. Thus, the pH change that occurs in the vicinity of the electrode is efficiently transmitted to the gel/electrode complexes 4a and 4b. This leads to efficient expansion and contraction. The volume change of the gel/electrode complexes 4a and 4b generates a force large enough to actuate robot's articulations (movable parts).

The polymer actuator 1 according to the present invention has the gel/electrode complexes 4a and 4b, in which the electrodes 3a and 3b should preferably be an electron conductor which follows the volume change of the polymeric hydrogels 2a and 2b. For example, they should preferably be a coiled metal wire, which undergoes elastic deformation to follow the volume change of the gel/electrode complexes 4a and 4b. The coiled metal wire should preferably be as thin as possible so that it easily follows the volume change.

The electrodes 3a and 3b should preferably be formed from a material which does not oxidize or reduce (for dissolution and passivation) upon voltage application. Examples of such a material include gold, platinum, palladium, amorphous carbon, and graphite, with the last two being preferable because of light weight.

The electrolytic aqueous solution 6 may be an aqueous solution containing any known water-soluble electrolyte dissolved therein. The higher the concentration of electrolyte, the higher the ion conductivity and the faster the pH change. However, the electrolytic aqueous solution 6 with a high concentration absorbs water from the polymeric hydrogels 2a and 2b due to difference in osmotic pressure. This prevents the expansion of the gel/electrode complexes 4a and 4b. By contrast, the electrolytic aqueous solution 6 with a low concentration does not prevent the expansion of the gel/electrode complexes 4a and 4b, but it may be slow in response. Therefore, the concentration of electrolyte should preferably be 0.01 to 0.5 mol/dm3.

The container 5 is one which holds the electrolytic aqueous solution 6. It also functions as a terminal which converts the displacement of the gel/electrode complexes 4a and 4b into a mechanical work. The container 5 may broadly vary in shape and material; it is required to tightly seal the electrolytic aqueous solution 6 and to be flexible enough to permit the displacement of the gel/electrode complexes 4a and 4b. It should preferably be a baglike container made of film of polymeric material such as polyethylene, polypropylene, polyvinyl chloride, polyvinylidene chloride, and fluorocarbon resin.

The terminals 7 electrically connected to the electrodes 3a and 3b of the gel/electrode complexes 4a and 4b project from the container 5 without aggravating the sealability of the container 5. Since the container 5 is flexible enough to follow the volume change of the gel/electrode complexes 4a and 4b, it changes in shape in response to the displacement of the gel/electrode complexes 4a and 4b whose ends are fixed to it. Therefore, the ends 5' of the container may be fixed to a mechanism (not shown) to be moved for mechanical work. The ends 5' may also work as the electrode terminals mentioned above.

If the container 5 is not flexible, the ends 5' may not be fixed to the container 5 but may be slidable along the wall surface of the container 5, so that the container 5 follows the volume change of the gel/electrode complexes 4a and 4b.

In the polymer actuator according to the present invention, the polymer gel constituting the gel/electrode complexes may contain both acidic functional groups and basic functional groups. In this case, expansion takes place as the basic groups cationize when the pH value of the electrolytic solution is low in the vicinity of the gel/electrode complex. When the pH value is high, expansion also takes place as the acidic groups anionize. However, in the neutral region, both ionized functional groups form ion complexes through ionic bond, which results in contraction.

This phenomenon also occurs in the case where the polymer gel constituting the gel/electrode complexes is composed of a polymer having acidic functional groups and a polymer having basic functional groups.

The gel in the gel/electrode complex expands in the neutral electrolytic solution when the electrode potential is either noble or base; however, it contacts when the electrode potential is restored to an equilibrium potential. This obviates the necessity for two kinds of gels for cathode and anode. Thus, the gel/electrode complexes produce displacement in the linear direction upon application of voltage across the electrodes of the gel/electrode complexes of the same structure.

Figure 4A:
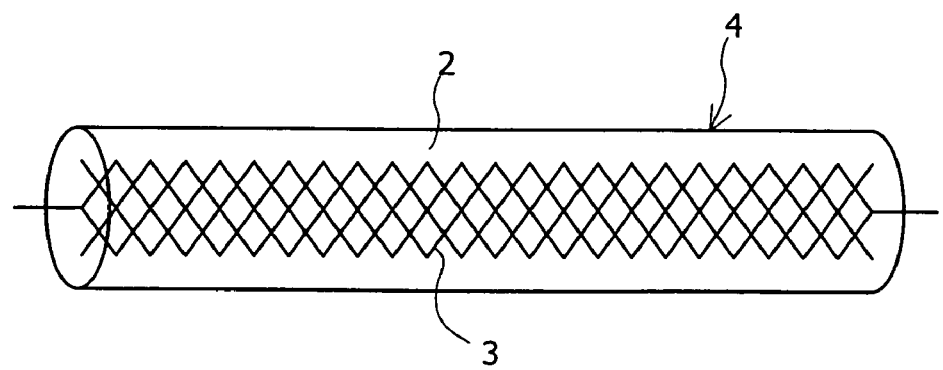
FIGS. 4A and 4B are schematic perspective views showing gel/electrode complex constituting the polymer actuator according to another embodiment of the present invention. They show the gel/electrode complex in its expanded (elongated) state and contracted state, respectively.
Figure 4B:
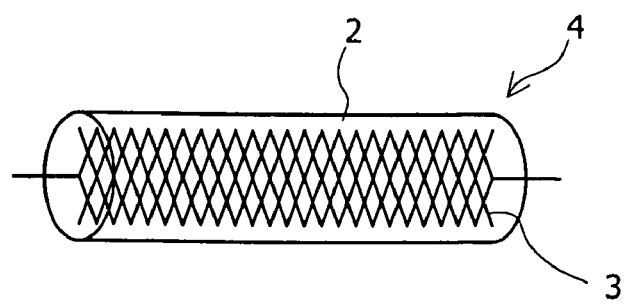
Figure 5:
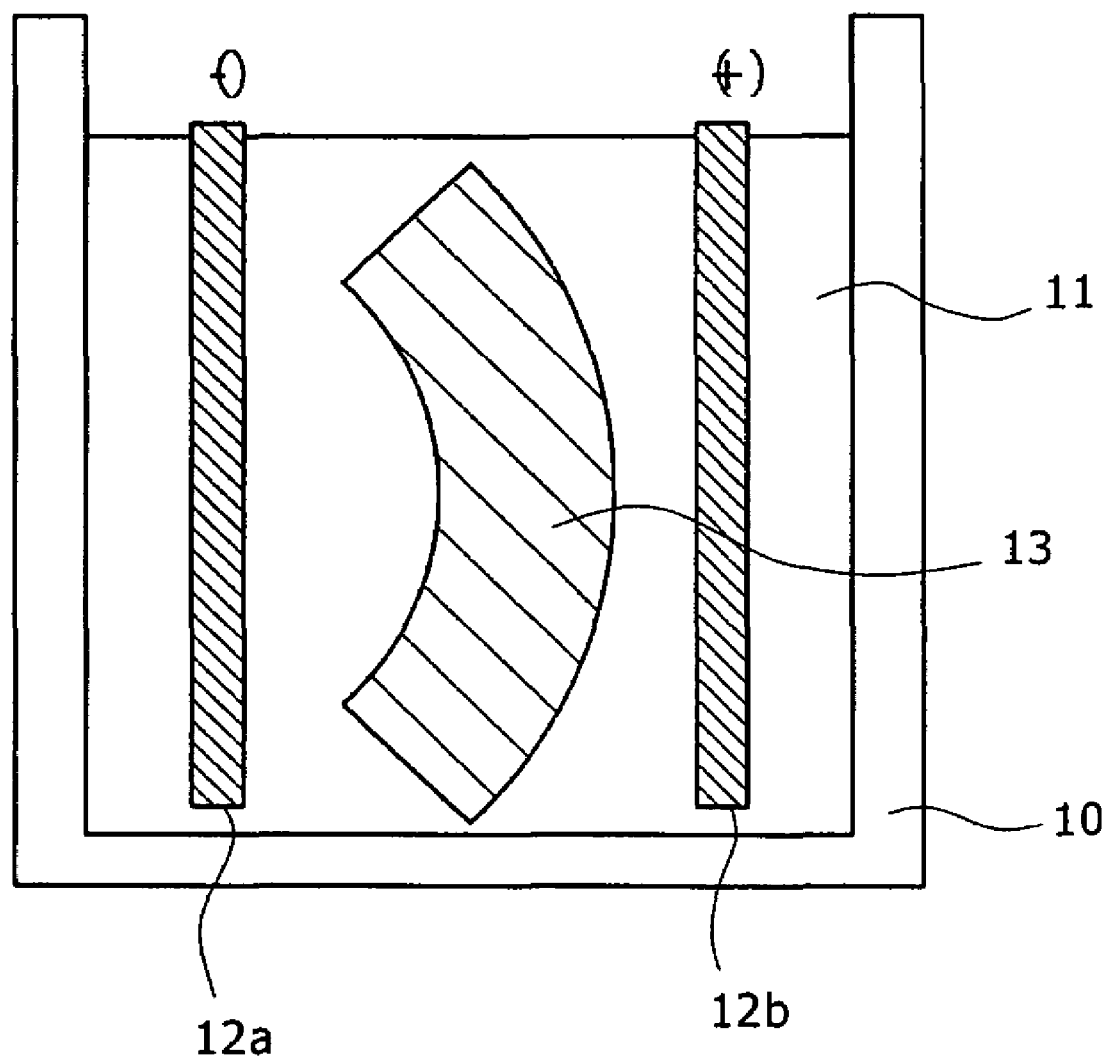
FIG. 5 is a schematic sectional view showing a conventional polymer actuator.

The electrode for the gel/electrode complex is not limited to the coiled metal wire illustrated above. It may be any electron conductor that follows the volume change of the polymer gel. An example is a metal mesh shown in FIGS. 4A and 4B. The metal mesh will be able to follow the volume change of the polymer gel through its elastic deformation as in the case of metal wire mentioned above. The metal mesh should be formed from fine metal wires to ensure the net's flexibility.

The electrode constituting the gel/electrode complexes may be formed from an electrically conductive granular or fibrous material mixed with or dispersed in the polymer gel. Such an electrode effectively induces the pH change without interfering with the volume change of the polymer gel.

Moreover, the electrode constituting the gel/electrode complexes may be formed from a coiled metal wire or a metal mesh and an electrically conductive granular or fibrous material in combination with each other. The resulting electrode will induce the pH change more rapidly throughout the gel/electrode complexes, thereby making the actuator to respond much faster.

The material constituting the electrodes should not oxidize or reduce (for dissolution and passivation) upon voltage application. Examples of such a material include gold, platinum, palladium, amorphous carbon, and graphite, with the last two being preferable because of light weight.

The polymer gel having acidic or basic functional groups which constitutes the gel/electrode complexes include polymers having acidic functional groups, such as carboxylic acid and sulfonic acid, and polymer having basic functional groups, such as primary amine and secondary amine.

Examples of the polymers having acidic functional groups include polyacrylic acid, polymethacrylic acid, polyvinyl acetate, polymaleic acid, polyvinylsufonic acid, and polystyrenesulfonic acid.

Examples of the polymers having basic functional groups include polyethyleneimine, polyallylamine, polyvinylpyridine, polylysine, polyvinylimidazole, poly(aminoethyl acrylate), poly(methylaminoethyl acrylate), poly(dimethylaminoethyl acrylate), poly(ethylaminoethyl acrylate), poly (ethylaminoethyl acrylate), poly(diethylaminoethyl acrylate), poly(aminoethyl methacrylate), poly(methylaminoethyl acrylate), poly(dimethyaminoethyl methacrylate), poly(ethylaminoethyl methacrylate), poly(ethylmethylaminoethyl methacrylate), poly(diethylaminoethyl methacrylate), poly(aminopropyl acrylate), poly(methylaminopropyl acrylate), poly(dimethylaminopropyl acrylate), poly-(ethylaminopropyl acrylate), poly(ethylmethylaminopropyl acrylate), poly(diethylaminepropyl acrylate), poly(aminopropyl methacrylate), poly(methylaminopropyl methacrylate), poly (dimethylaminopropyl methacrylate), poly(ethylaminopropyl methacrylate), poly(ethylmethylaminopropyl methacrylate), and poly(diethylaminopropyl methacrylate).

If necessary, these polymers may have intra- or intermolecular crosslinking or may be mixed with other polymers. They may also be in the form of copolymer composed of different monomers.

The gel/electrode complexes are not limited in their number so long as at least two units are used in combination. In the case where more than one acidic gel/electrode complex and more than one basic gel/electrode complex are used in combination, it is necessary that the number of the former be equal to the number of the latter because the former is given negative voltage and the later is given positive voltage.

In the case where the polymer gel constituting the gel/electrode complexes contains a polymer having acidic functional groups and basic functional groups, or in the case where the polymer gel constituting the gel/electrode complexes contains a mixture of polymers each having acidic functional groups and basic functional groups, the total number of the gel/electrode complexes should preferably be even so that half of them are given negative voltage and another half of them are given positive electrode.

EXAMPLES

The invention will be described with reference to the following examples in which the polymer actuator of the present invention was actually prepared and operated.

Example 1

In this example, the polymeric hydrogel for the gel/electrode complexes is prepared from an aqueous solution of monomer, crosslinking agent, and initiator by radical polymerization.

The monomer for the polymer having acidic functional groups is acrylic acid. The crosslinking agent is N,N'-methylenebisacrylamide. The initiator is ammonium persulfate. The aqueous solutions (as the gel precursor) is composed of the monomer, crosslinking agent, and initiator in a molar ratio of 100:3:1.

The electrode is a coil (1 mm in diameter) of platinum wire (10 □m in diameter). It is placed in a glass tube, 1.5 mm in inside diameter and 30 mm long, and then it is fixed so that the axis of the coil coincides with the axis of the glass tube.

The glass tube is filled with the gel precursor solution. With its both ends closed by rubber stoppers, the filled glass tube is heated at 50° C. so that the gel precursor solution undergoes gelation. The resulting gel is discharged by applying pressure to one end of the glass tube. Thus there is obtained the acidic gel/electrode complex (in which the polymer gel contains acidic functional groups).

Also, another gel precursor solution is prepared from dimethylaminomethyl acrylate (as a monomer for the polymer having basic functional groups), N,N'-methylenebisacrylamide (as a crosslinking agent), and ammonium persulfate (as an initiator). The gel precursor solution is composed of the monomer, crosslinking agent, and initiator in a molar ratio of 100:3:1. It is made into the basic gel/electrode complex (in which the polymer gel contains basic functional groups) in the same way as mentioned above for the acidic gel/electrode complex.

The thus obtained acidic gel/electrode complex and basic gel/electrode are immersed in 0.1 N aqueous solution of NaCl for 24 hours. Each of them is placed into a tubular polyethylene film, 6 mm in diameter and 50 mm long. With one end heat-sealed, the tubular polyethylene film is filled with a 0.1 N aqueous solution of NaCl, and the other end is heat-sealed. Incidentally, heat sealing is performed in such a way that the coil extending outward from the ends of the tubular polyethylene film is fixed in the polyethylene film. The projecting end of the coil serves as the electrode terminal. Thus there is obtained the polymer actuator as shown in FIG. 1 and FIGS. 2A and 2B.

The resulting polymer actuator, in which the acidic gel/electrode complex serves as a cathode and the basic gel/electrode complex serves as an anode, was tested by applying a voltage of 3 V across the anode and cathode. It was found that polymer actuator decreased in length between the heat-sealed parts from 45 mm to 25 mm as the result of contraction of both of the gel/electrode complexes. The change in length took place within 45 seconds. The force generated by the displacement in the lengthwise direction was about 0.3 MPa.

Example 2

In this example, the polymeric hydrogel for the gel/electrode complexes is prepared from an aqueous solution of monomer, crosslinking agent, and initiator by radical polymerization.

The monomer for the polymer having acidic functional groups is acrylic acid. The monomer for the polymer having basic functional groups is dimethylaminomethyl methacrylate. The crosslinking agent is N,N'-methylenebisarcylamide. The initiator is ammonium persulfate. The aqueous solution (as the gel precursor) is composed of the acidic monomer, basic monomer, crosslinking agent, and initiator in a molar ratio of 50:50:3:1.

The electrode is a coil (1 mm in diameter) of platinum wire (10 □m in diameter). It is placed in a glass tube, 1.5 mm in inside diameter and 30 mm long, and then it is fixed so that the axis of the coil coincides with the axis of the glass tube.

The glass tube is filled with the gel precursor solution. With its both ends closed by rubber stoppers, the filled glass tube is heated at 50° C. so that the gel precursor solution undergoes gelation. The resulting gel is discharged by applying pressure to one end of the glass tube. Thus there is obtained the amphoteric gel/electrode complex (in which the polymer gel contains both acidic and basic functional groups).

Two units of the thus obtained amphoteric gel/electrode complex are immersed in 0.1 N aqueous solution of NaCl for 24 hours. Each of them is placed into a tubular polyethylene film, 6 mm in diameter and 50 mm long. With one end heat-sealed, the tubular polyethylene film is filled with a 0.1 N aqueous solution of NaCl, and the other end is heat-sealed. Incidentally, heat sealing is performed in such a way that the coil extending outward from the ends of the tubular polyethylene film is fixed in the polyethylene film. The projecting end of the coil serves as the electrode terminal. Thus there is obtained the polymer actuator as shown in FIG. 1 and FIGS. 2A and 2B.

The resulting polymer actuator, in which one of the gel/electrode complexes serves as a cathode and the other of the gel/electrode complexes serves as an anode, was tested by applying a voltage of 3 V across the anode and cathode. It was found that polymer actuator increased in length between the heat-sealed parts from 30 mm to 45 mm as the result of expansion of both of the gel/electrode complexes. The change in length took place within 44 seconds. The force generated by the displacement in the lengthwise direction was about 0.3 MPa.

Example 3

In this example, the polymeric hydrogel for the gel/electrode complexes is prepared from an aqueous solution of monomer, crosslinking agent, and initiator by radical polymerization.

The monomer for the polymer having basic functional groups is dimethylaminomethyl methacrylate. The polymer having acidic functional groups is polyacrylic acid. The crosslinking agent is N,N'-methylenebisarcylamide. The initiator is ammonium persulfate. The aqueous solution (as the gel precursor) is composed of the basic monomer, acidic polymer, crosslinking agent, and initiator in a molar ratio of 50:50:3:1. The amount of polyacrylic acid is measured in terms of mol.

The electrode is a coil (1 mm in diameter) of platinum wire (10 □m in diameter). It is placed in a glass tube, 1.5 mm in inside diameter and 30 mm long, and then it is fixed so that the axis of the coil coincides with the axis of the glass tube.

The glass tube is filled with the gel precursor solution. With its both ends closed by rubber stoppers, the filled glass tube is heated at 50° C. so that the gel precursor solution undergoes gelation. The resulting gel is discharged by applying pressure to one end of the glass tube. Thus there is obtained the acidic-basic gel/electrode complex in which the polymer gel is a mixture of polymers each containing acidic functional groups and basic functional groups.

Two units of the thus obtained acidic-basic gel/electrode complex are immersed in 0.1 N aqueous solution of NaCl for 24 hours. Each of them is placed into a tubular polyethylene film, 6 mm in diameter and 50 mm long. With one end heat-sealed, the tubular polyethylene film is filled with a 0.1 N aqueous solution of NaCl, and the other end is heat-sealed. Incidentally, heat sealing is performed in such a way that the coil extending outward from the ends of the tubular polyethylene film is fixed in the polyethylene film. The projecting end of the coil serves as the electrode terminal. Thus there is obtained the polymer actuator as shown in FIG. 1 and FIGS. 2A and 2B.

The resulting polymer actuator, in which one of the gel/electrode complexes serves as a cathode and the other of the gel/electrode complexes serves as an anode, was tested by applying a voltage of 3 V across the anode and cathode. It was found that polymer actuator increased in length between the heat-sealed parts from 30 mm to 45 mm as the result of expansion of both of the gel/electrode complexes. The change in length took place within 44 seconds. The force generated by the displacement in the lengthwise direction was about 0.3 MPa.

Example 4

The same procedure as in Example 1 was repeated to prepare the polymer actuator except that the gel precursor solution was incorporated with carbon powder (crushed carbon fiber) corresponding to 5 wt % of the monomer weight.

The resulting polymer actuator was tested by applying a voltage of 3 V to the acid gel/electrode complex (as the cathode) and the basic gel/electrode complex (as the anode). It was found that polymer actuator decreased in length between the heat-sealed parts from 45 mm to 31 mm as the result of expansion of both of the gel/electrode complexes. The change in length took place within 21 seconds. The force generated by the displacement in the lengthwise direction was about 0.3 MPa.

Exploitation in Industry

The polymer actuator according to the present invention includes a plurality of gel/electrode complexes arranged in an electrolytic solution, said gel/electrode complex being composed of a polymer gel containing acidic or basic functional groups and electrodes placed in the polymer gel, such that it changes in volume upon application of a voltage across said electrodes. Therefore, the polymer actuator obviates the necessity for heating and cooling units, pumps, and reservoirs unlike conventional ones, and it is light in weight and capable of control with a low voltage, say 1 to 3 V.

Moreover, it is capable of expansion and contraction in the linear direction like skeletal muscles without curved displacement unlike conventional ones. The gel/electrode complex changes in volume to generate a force that actuates robots' articulations (movable parts).

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A polymer actuator comprising a plurality of gel/electrode complexes arranged in an electrolytic solution, said gel/electrode complex being composed of a polymer gel containing acidic or basic functional groups and electrodes placed in the polymer gel, such that the polymer actuator changes in volume upon application of a voltage across said electrodes.

2. The polymer actuator as defined in claim 1, wherein the electrolytic solution changes in pH value in proximity of the gel/electrode complexes upon voltage application across the electrodes, and the gel/electrode complexes change in volume in response to the pH change.

3. The polymer actuator as defined in claim 1, further comprising more than one unit of the gel/electrode complex composed of a polymer gel having acidic functional groups and more than one unit of the gel/electrode complex composed of a polymer gel having basic functional groups.

4. The polymer actuator as defined in claim 1, wherein the polymer gel constituting the gel/electrode complex contains a polymer having acidic functional groups and basic functional groups.

5. The polymer actuator as defined in claim 1 wherein the polymer gel constituting the gel/electrode complex contains a mixture of polymers each having acidic functional groups and basic functional groups.

6. 19 The polymer actuator as defined in claim 1, wherein the gel/electrode complexes are arranged parallel to each other.

7. The polymer actuator as defined in claim 1, wherein the gel/electrode complexes are arranged in a container which is filled with said electrolytic solution and said container has electrodes projecting from its both ends.

8. The polymer actuator as defined in claim 7, wherein the container is flexible so as to follow the volume change of the gel/electrode complex.

9. The polymer actuator as defined in claim 1, wherein the polymer gel is a polymeric hydrogel and the electrolytic solution is an electrolytic aqueous solution.

10. The polymer actuator as defined in claim 1, wherein the electrode constituting the gel/electrode complex is a coiled metal wire or a metal mesh.

11. The polymer actuator as defined in claim 1, wherein the electrode constituting the gel/electrode complex is any one of an electrically conductive granular, and a fibrous substance mixed with or dispersed in the polymer gel.

12. The polymer actuator as defined in claim 1, wherein the electrode constituting the gel/electrode complex is composed of a coiled metal wire or a metal mesh and an electrically conductive granular or fibrous substance.

13. The polymer actuator as defined in claim 1, wherein the electrode is made of at least one species selected from the group consisting of gold, platinum, palladium, amorphous carbon, and graphite.

* * * * *